Aug. 18, 1925.　　　　　　　　　　　　　　　1,549,780
C. E. MARCHESSAULT
FOLDING SUN AND HEADLIGHT GLARE SHIELD FOR AUTOMOBILES
Filed Nov. 3, 1924　　　2 Sheets-Sheet 1

INVENTOR.
CHARLES E. MARCHESSAULT
BY HIS ATTORNEY

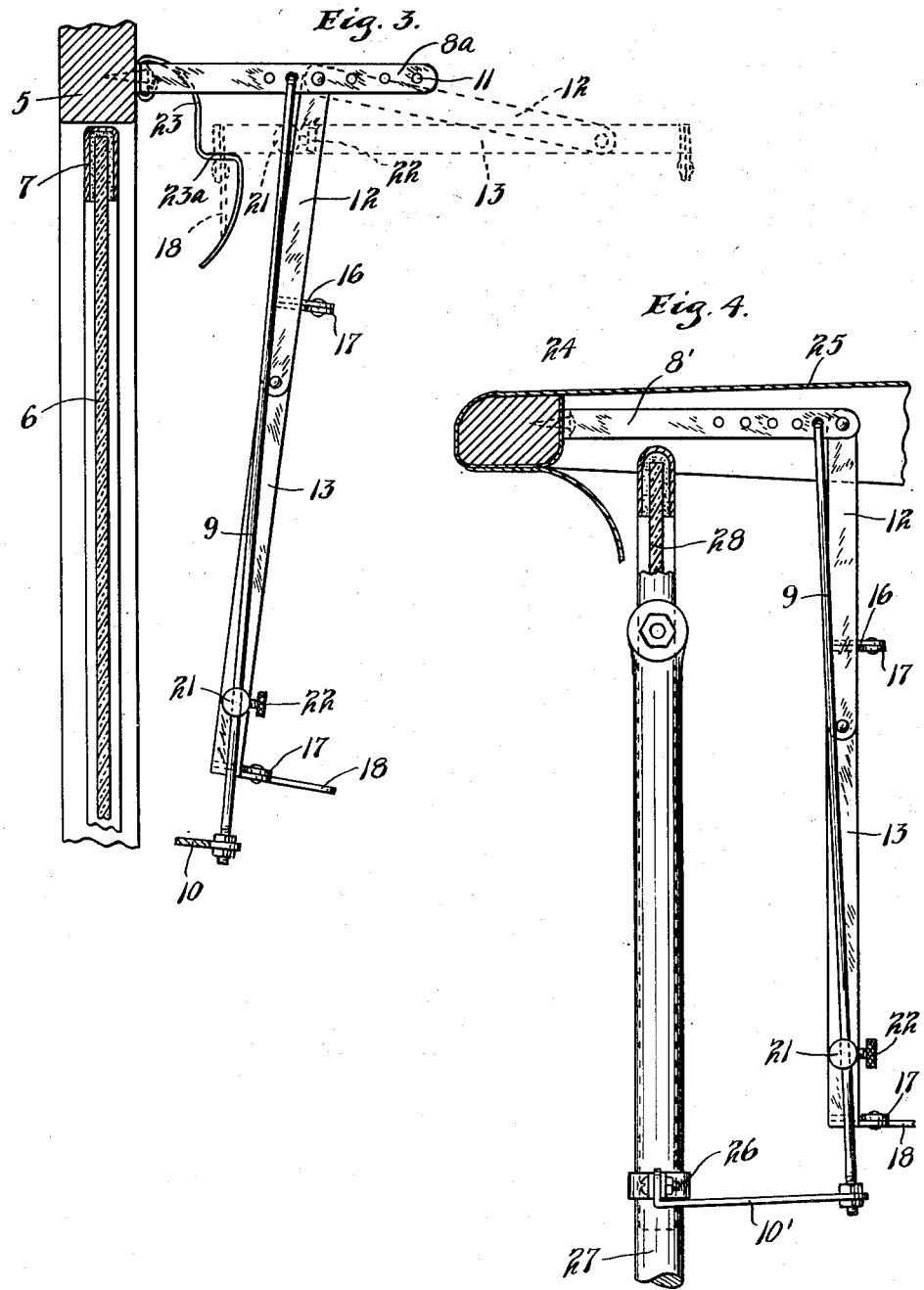

Patented Aug. 18, 1925.

1,549,780

UNITED STATES PATENT OFFICE.

CHARLES E. MARCHESSAULT, OF MINNEAPOLIS, MINNESOTA.

FOLDING SUN AND HEADLIGHT GLARE SHIELD FOR AUTOMOBILES.

Application filed November 3, 1924. Serial No. 747,485.

*To all whom it may concern:*

Be it known that I, CHARLES E. MARCHESSAULT, a citizen of the United States, residing at Minneapolis, in the county of Hennepin and State of Minnesota, have invented certain new and useful Improvements in Folding Sun and Headlight Glare Shields for Automobiles; and I do hereby declare the following to be a full, clear, and exact description of the invention, such as will enable others skilled in the art to which it appertains to make and use the same.

This invention relates to an anti-glare device adapted to be used on a vehicle, such as a modern automobile. As is well known to drivers of such vehicles, an objectionable glare is often encountered from the sun when the same is at low elevation or from the headlights of approaching cars.

It is an object of this invention to provide a very simple and convenient device of comparatively small size adapted to be carried adjacent the wind shield and to be so supported that it can be readily and conveniently swung out of operative position and out of the way at the top of the wind shield.

It is a further object of the invention to provide such a device comprising a plurality of sections of transparent material, preferably colored, mounted to swing about vertical axes so that they can be disposed substantially in one plane or swing into parallel planes at an angle to said plane.

It is a further object of the invention to provide such a device comprising a frame in which are mounted vertically disposed sections of transparent material having pivots journaled in the top and bottom portions of said frame, together with means connected to said pivots for swinging said sections substantially into line or into parallel positions.

It is still another object of the invention to provide such a device as set forth in the preceding paragraph, together with a yoke secured in position above the wind shield, to each side of which the sides of said frame are swingingly connected, a guiding means being provided at the side of said frame on which slides a guide connected to said frame.

These and other objects and advantages of the invention will be fully set forth in the following description made in connection with the accompanying drawings in which like reference characters refer to the same parts throughout the different views, and in which, Fig. 1 is a view in front elevation of the device showing parts of the automobile to which the same is applied;

Fig. 3 is a view in vertical section taken on the line 3—3 of Fig. 1, as indicated by the arrows; and Fig. 4 is a view similar to Fig. 3 showing a modified form of the device.

Figure 1:
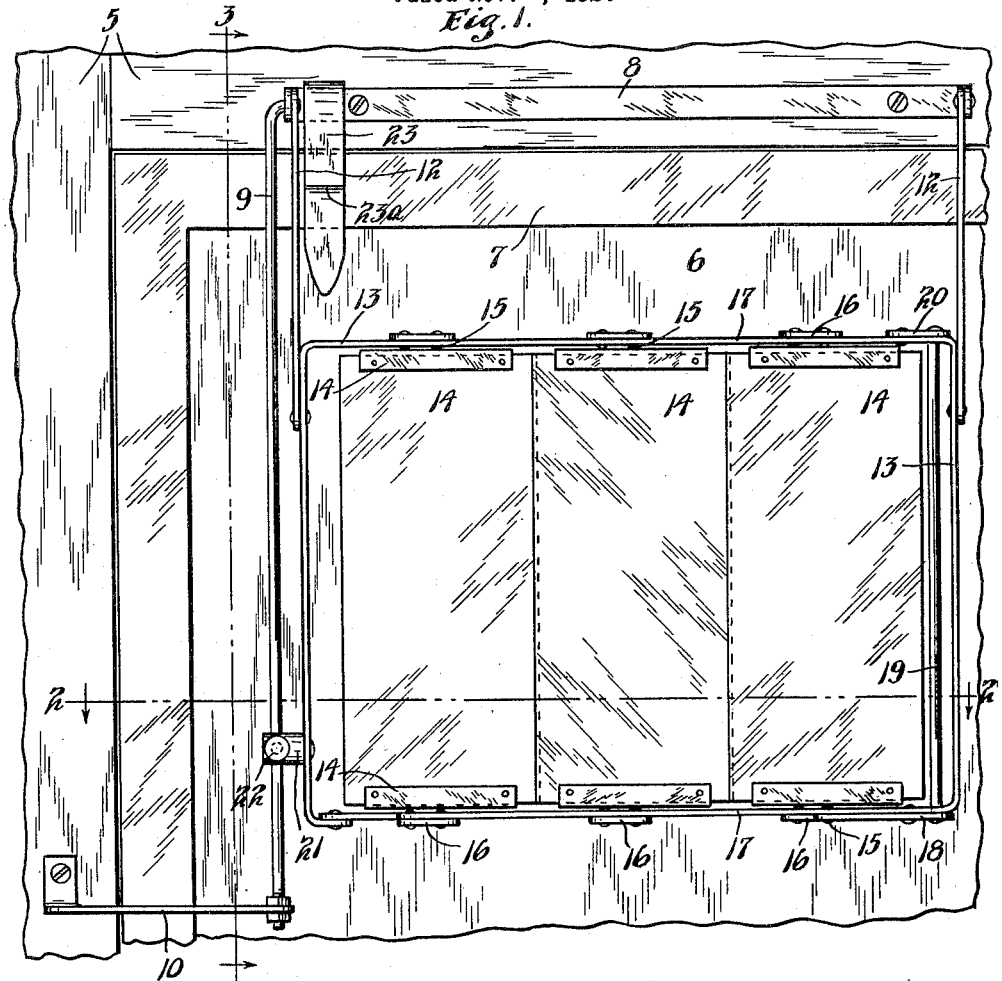
Figure 2:
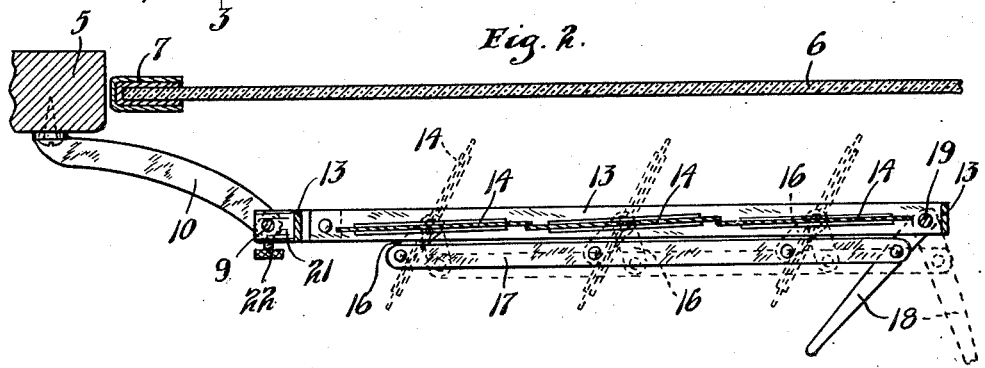
Fig. 2 is a horizontal section taken on the line 2—2 of Fig. 1, as indicated by the arrows.

Referring to the drawings, particularly Fig. 1, portions of an automobile of the closed type are shown comprising the front body portion 5, and the wind shield 6 with its surrounding frame 7. Secured to the top of the portion 5 is a yoke 8. While this yoke may be made of any suitable material and take various forms, in the embodiment of the invention illustrated, the same is shown as comprising a flat strip attached by suitable screws to the portion 5 and adjacent one side of the wind shield and having its ends bent to project outwardly substantially at right angles. Secured in one side or arm of the member 8 is a rod 9, said rod having its upper end bent substantially at a right angle and passing through an aperture in said arm and being riveted therein. Said arm 9 extends downward substantially vertically and has its lower end threaded and projecting through the outer end of an arm 10 being held therein by nuts threaded thereon at each side of arm 10. The arm 10, as shown is formed of a flat strip having one end bent substantially at a right angle and secured to the side of the portion 5 by a suitable screw. It will be noted that the arms 8ª of the member 8 are provided with a plurality of holes 11, said arms are made of considerable length and provided with such a plurality of holes in order to accommodate and fit different makes of automobiles. When the device is mounted the ends of the arms 8ª may be cut off. Pivotally connected to the arms 8ª, respectively, through one of the holes 11 are links 12 which extend downwardly and are pivotally connected at their lower end to each side of a frame member 13. While the frame member 13 may be of various forms, in the embodiment of the invention illustrated, the same is shown as substantially rectangular and the links 6 are pivoted to the exterior of the vertical sides thereof, and adjacent the top of said frame. Disposed in the frame 13 is a plurality of sections 14 of transparent material, such as celluloid, and this material, preferably will be colored, a comparatively dark color, such as green, being preferred. The sections 14 are illustrated as rectangular vertically disposed strips and each of said sections is secured to and carried in a U-shaped clip 14 at its top and bottom. The clips 14 have vertically disposed pivot members 15, which pivot members are journaled in the top and bottom portions of the frame 13. Said pivot members 15 have secured thereto at the outer sides of said top and bottom portions, links 16, and bars 17 disposed respectively at the top and bottom of the frame 13 are connected to the other ends of the links 16. The lower bar 17 has its end pivoted intermediate the ends of a hand lever 18, the end of which is secured to the lower end of a rod 19 journaled in and extending between the top and bottom portions of the frame 13 and secured at its upper end to a link 20, which link is pivotally connected at its other end to the end of the upper bar 17. As shown in Fig. 2, the free end of lever 18 is tapered and rounded. A block 21 is illustrated as circular in shape, is pivotally secured to one side of frame 13 to turn about a horizontal axis and is provided with a vertically extending aperture through which rod 9 passes. A thumb set screw 22 extends into block 21 and is adapted to engage the rod 9. A spring strip 23 is secured to the body 5 adjacent one end of member 8 and extends outwardly and downwardly from said body. It will be noted that said spring has a horizontal shoulder portion 23ª intermediate its length.

In Fig. 4 the device is shown applied to an automobile of the open type or touring car type. With such a type, the member 8' corresponding to the member 8 will be secured to the bow or rib 24 at the top 25 of the automobile. The arm 10' corresponding to the arm 10 will be secured to a clamping clip 26 embracing one of the side supports 27 of the wind shield 28. The other parts of the device including the rod 9, the links 12 and frame 13, will be the same as already described, in connection with Figs. 1 to 3.

With the device mounted as shown, when it is desired to use the same it will be positioned in the rear of the wind shield, as illustrated in Figs. 1 to 3. The sections 14 can be disposed, as shown in full lines in Fig. 2, being then substantially in line or disposed substantially in one plane. When so disposed, said transparent sections will form an efficient anti-glare shield and the light of the sun will effectively be dimmed. The device will thus form an efficient sun shield. In the daytime when there is plenty of light it is not difficult to observe the side of the road. When the device is used at night the lever 18 will be swung to turn the sections 14 on their pivots so that they are disposed in parallel relation at an angle to the plane in which they aline, as indicated in dotted lines in Fig. 2. The driver can now look between the sections and observe the right hand side of the road so that he will not run off from the same. At the same time, the glare from the headlight of an approaching car, which will be at the left, will strike the sections 14 but will be dimmed and reflected thereby so that it will not reach the driver's eyes and thus blind him. The sections 14 are capable of being turned to stand at approximately ninety degrees to the plane of the frame 13 and when no cars are passing the said sections can be so placed. They will then not interfere with the vision or driving of the driver. When a car approaches the driver can merely turn the lever 18 a short distance and set the sections 14 at the desired angle, as shown in dotted lines in Fig. 2. In such position, the device forms a very efficient and safe glare shield for the headlights of approaching cars. When the use of the device is not desired, the operator simply takes hold of the bottom thereof and pushes upwardly thereon. The block 21 then slides upwardly on the rod 9, screw 22 being loosened and the links 12 swing about their pivoted ends so that the device comes into position shown in dotted lines in Fig. 3. The lower end of the frame 13 slides against the lower end of spring 23 and pushes the same rearwardly until said end passes the edge of shoulder 23ª when the spring flexes outwardly so that the edge of frame 13 is supported on the shoulder 23ª. The screw 22 can be tightened so that the frame will not drop down if, for any reason it should become disengaged from the spring 23. When it is again desired to use the shield the screw 22 can be quickly loosened and the frame simply swung outwardly and downwardly.

From the above description it is seen that applicant has provided a very simple and efficient anti-glare shield and one that will have great utility in eliminating the objectionable glare from the sun or from the headlights of approaching cars. The device is extremely simple in construction and can be readily applied to all standard cars. The device is easily moved to and from operative position and when in inoperative position, is entirely out of the way of the driver. The device has been amply demonstrated in actual practice and found to be very successful and efficient.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. An anti-glare shield for a vehicle comprising a plurality of sections of transparent sheet material, each revoluble about a substantially vertical axis, said sections being movable so as to be alined in substantially one plane or to be disposed in parallel planes whereby sight openings are provided between said sections, a common means for swinging said sections about their axes, and means for supporting said wind shield adjacent the wind shield of an automobile.

2. An anti-glare device for automobiles comprising a substantially rectangular frame with horizontal top and bottom members, a plurality of sections of transparent colored sheet material journaled in said top and bottom members to rotate about their central vertical axes, and means connected to said sections for swinging them substantially into the central vertical plane of said frame or into parallel planes at an angle thereto.

3. An anti-glare device for automobiles comprising a substantially rectangular frame with horizontal top and bottom members, a plurality of sections of transparent colored sheet material in said frame disposed in parallel relation, alined pivots at the top and bottom of each section journaled, respectively, in the top and bottom members of said frame, a link connected to each of said pivots, bars at the top and bottom of said frame pivotally connected to said links, and means connected to the ends of said bars for moving the same and swinging said sections about their pivots.

4. An anti-glare shield adapted to be placed in the rear of the wind shield of an automobile comprising a frame, a colored transparent shield secured therein, a support for said frame above the wind shield, swinging members pivoted to said support and to said frame, a substantially vertical guide at the side of said frame, and means on said frame engaging said guide, said frame being swingable from a substantially vertical position to a substantially horizontal position at the top of said wind shield, and means for holding said frame in such position.

5. The structure set forth in claim 4, said means engaging said guide being pivoted to said frame to turn about a horizontal axis.

6. An anti-glare device adapted to be disposed in the rear of the wind shield of an automobile, a yoke secured to the frame of said automobile above said wind shield and having projecting arms, links pivotally connected to said arms and depending therefrom, a rectangular frame having its sides pivotally connected to said links respectively, a plurality of sections of transparent colored material carried in said frame, a rod extending at one side of said frame secured at its top end to said yoke, an arm secured to the frame of the automobile to which the lower end of said rod is secured, a block slidable on said rod and pivotally connected to said frame adjacent the bottom thereof, said frame being swingable from a substantially vertical position in front of said wind shield to a substantially horizontal position adjacent the top of said wind shield, and means for holding said frame in such horizontal position.

7. An anti-glare shield adapted to be placed in the rear of the wind shield of an automobile comprising a frame, a plurality of colored transparent shield plates secured therein, said plates being connected and rotatable about vertical axes so as to be maintained in parallel relation and adapted to be disposed in a position substantially parallel to said windshield or at an angle thereto.

8. An anti-glare device adapted to be disposed adjacent the wind shield of an automobile comprising a frame with substantially horizontal top and bottom members, a plurality of sections of transparent colored sheet material journaled in said top and bottom members to rotate about parallel vertically disposed axes, and means connected to said sections for swinging them substantially into the central vertical plane of said frame or into parallel planes at an angle thereto, said frame also being bodily movable out of horizontal alinement with said wind shield.

In testimony whereof I affix my signature.

CHARLES E. MARCHESSAULT.